United States Patent
Pang et al.

(10) Patent No.: US 9,716,850 B2
(45) Date of Patent: Jul. 25, 2017

(54) BJT PIXEL CIRCUIT CAPABLE OF CANCELLING AMBIENT LIGHT INFLUENCE, IMAGE SYSTEM INCLUDING THE SAME AND OPERATING METHOD THEREOF

(71) Applicant: PIXART IMAGING (PENANG) SDN.BHD., Penang (MY)

(72) Inventors: Kwai-Lee Pang, Penang (MY); Swee-Lin Thor, Penang (MY); Lee-Ling Teh, Penang (MY)

(73) Assignee: PixArt Imaging (Penang) SDN. BHD., Penang (MY)

( * ) Notice: Subject to any disclaimer, the term of this patent is extended or adjusted under 35 U.S.C. 154(b) by 153 days.

(21) Appl. No.: 14/847,132

(22) Filed: Sep. 8, 2015

(65) Prior Publication Data

US 2017/0070688 A1 Mar. 9, 2017

(51) Int. Cl.
*H04N 5/3745* (2011.01)
*H04N 5/353* (2011.01)
*H04N 5/378* (2011.01)

(52) U.S. Cl.
CPC ........... *H04N 5/3745* (2013.01); *H04N 5/353* (2013.01); *H04N 5/378* (2013.01)

(58) Field of Classification Search
CPC .. H04N 5/378; H04N 5/37452; H04N 5/3745; H01L 27/2445; H01L 27/14681; H01L 27/14614; H01L 27/14612; H01L 27/14609
See application file for complete search history.

(56) References Cited

U.S. PATENT DOCUMENTS

| | | | | |
|---|---|---|---|---|
| 5,705,807 A * | 1/1998 | Throngnumchai | ... | G01J 1/4228 250/214 B |
| 6,021,210 A * | 2/2000 | Camus | ................. | A61B 3/1216 348/370 |
| 6,801,258 B1 * | 10/2004 | Pain | ..................... | H04N 3/1562 250/208.1 |
| 8,564,579 B2 * | 10/2013 | Kwon | ....................... | G01J 1/32 345/102 |
| 2008/0203277 A1 * | 8/2008 | Warszauer | ........... | H04N 5/2256 250/208.1 |

* cited by examiner

*Primary Examiner* — Nhan T Tran
*Assistant Examiner* — Chriss Yoder, III
(74) *Attorney, Agent, or Firm* — Hauptman Ham, LLP

(57) ABSTRACT

There is provided a BJT pixel circuit including a BJT transistor, a photodiode, a first storage capacitor and a second storage capacitor. The first storage capacitor is configured to discharge, via the BJT transistor, to a first output voltage in a first exposure time of the photodiode. The second storage capacitor is configured to discharge, via the BJT transistor, to a second output voltage in a second exposure time of the photodiode.

16 Claims, 7 Drawing Sheets

BJT PIXEL CIRCUIT CAPABLE OF CANCELLING AMBIENT LIGHT INFLUENCE, IMAGE SYSTEM INCLUDING THE SAME AND OPERATING METHOD THEREOF

BACKGROUND

1. Field of the Disclosure

This disclosure generally relates to an image system and, more particularly, to a BJT pixel circuit capable of cancelling ambient light influence, an image system including the same and an operating method thereof.

2. Description of the Related Art

Referring to FIG. 1, it is a schematic diagram of a conventional bipolar junction transistor (BJT) pixel circuit 100. The BJT pixel circuit 100 includes a photodiode 11, a BJT transistor 13, a pixel capacitor Cp, a power source $V_{DD}$, a plurality of switching elements SWres, SWshut, SW0, SW0d and two source followers SF and SFd.

FIG. 2 is an operational timing diagram of an image sensor including the BJT pixel 100 of FIG. 1, and herein the sensor array having three pixel circuits P1, P2 and P3 is taken as an example for illustration purpose.

The BJT pixel circuit 100 may operate in two phases, including a reset phase and a shutter phase, by controlling the switching elements, wherein in the reset phase the switching elements SWres are conducted, while in the shutter phase the switching element SWshut is conducted. The reset phase is used to release charges left in the photodiode 11 and to charge the pixel capacitor Cp to an initial voltage Vint. The shutter phase is to allow the BJT pixel circuit 100 to discharge the initial voltage Vint and the discharging rate is a function of light intensity. FIG. 1 shows a state of the shutter phase which operates corresponding to a system light source 20. The system light source 20 is activated corresponding to a first frame A and deactivated corresponding to a second frame B (referring to FIG. 2), wherein the second frame B is sometimes referred to an ambient image frame.

In the first frame A, a period between the system light source 20 being activated (e.g. time $t_1$) and the switching element SWshut being conducted (e.g. time $t_2$) is referred to a pre-flash time, which is arranged to allow the BJT transistor 13 to achieve a stable output. After the switching element SWshut is conducted, charges held in the pixel capacitor Cp discharges via the BJT transistor 13 in an exposure time (e.g. time t2 to t3) to lower the initial voltage Vint, wherein a decrement of the initial voltage Vint corresponds to the light intensity received by the photodiode 11.

Then, the pixel circuit 100 outputs, via the switching element SW0, an output signal OUT. In addition, the pixel circuit 100 further outputs a reference signal OUTd via the switching element SW0d, wherein this reference signal OUTd is to cancel out switch injection and IR drop. F or example, in the first frame A, the pixel circuit 100 outputs a pair of output signal OUTon and reference signal OUTdon corresponding to each of the pixel circuits P1 to P3, i.e. three pairs of signals. Similarly, in the second frame B, the pixel circuit 100 outputs another pair of output signal OUToff and reference signal OUTdoff corresponding to each of the pixel circuits P1 to 93, i.e. another three pairs of signals.

The output signal OUT and the reference signal OUTd are then inputted into a transfer amplifier 17 for differential operation. Differential signals between the output signal OUT and the reference signal OUTd (e.g. OUTdon−OUTon and OUTdoff−OUToff) are converted into digital signals by an analog to digital converter (ADC) 18 and the digital signals are post-processed by a processor 19, wherein a sampling number of the ADC converter 18 is positively correlated with a size of the sensor array, e.g. three times per frame as shown in FIG. 2. In the conventional pixel circuit 100, in order to cancel the influence of ambient light, the processor 19 performs the subtraction operation on the differential signals at the digital back end, i.e. sum of ADC value_on−sum of ADC value_off.

However, the light intensity received by the photodiode 11 includes both system light and ambient light. When the ambient light is very strong (e.g. under sun light), the difference between the differential signal (OUTdon−OUTon) and the differential signal (OUTdoff−OUToff) becomes very small, even smaller than the resolution of the ADC 18, such that the processor 19 is unable to distinguish between the activation and deactivation of the system light source 20. Accordingly, when the pixel circuit 100 is applied to a proximity sensor, it is not possible to detect an approaching object under strong ambient light.

SUMMARY

Accordingly, the present disclosure further provides a bipolar junction transistor (BJT) pixel circuit capable of cancelling ambient light influence, an image system including the same and an operating method thereof.

The present disclosure provides a BJT pixel circuit configured to generate voltage signals corresponding to a light source signal, wherein the light source signal includes a light-on level and a light-off level. The pixel circuit includes a photodiode, a first shutter switch, a second shutter switch, a first storage capacitor and a second storage capacitor. The first shutter switch is configured to control a first exposure time of the photodiode to correspond to the light-on level according to a first shutter signal. The second shutter switch is configured to control a second exposure time of the photodiode to correspond to the light-off level according to a second shutter signal. The first storage capacitor has a first terminal coupled to the photodiode via the first shutter switch and a second terminal coupled to a ground. The first storage capacitor is configured to hold a first predetermined voltage before the first exposure time and discharge, via the photodiode, to a first output voltage in the first exposure time. The second storage capacitor has a first terminal coupled to the photodiode via the second shutter switch and a second terminal coupled to the ground. The second storage capacitor is configured to hold a second predetermined voltage before the second exposure time and discharge, via the photodiode, to a second output voltage in the second exposure time.

The present disclosure further provides an image system including a system light source and an image sensor. The image sensor includes a plurality of pixel circuits and an integrator. Each of the pixel circuits includes a photodiode, a first shutter switch, a second shutter switch, a first storage capacitor and a second storage capacitor. The first shutter switch is configured to control, according to a first shutter signal, a first exposure time of the photodiode to correspond to activating the system light source. The second shutter switch is configured to control, according to a second shutter signal, a second exposure time of the photodiode to correspond to deactivating the system light source. The first storage capacitor has a first terminal coupled to the photodiode via the first shutter switch and a second terminal coupled to a ground. The first storage capacitor is configured to hold a first predetermined voltage before the first exposure time and discharge, via the photodiode, to a first output voltage in the first exposure time. The second storage capacitor has a first terminal coupled to the photodiode via the second shutter switch and a second terminal coupled to the ground. The second storage capacitor is configured to hold a second predetermined voltage before the second exposure time and discharge, via the photodiode, to a second output voltage in the second exposure time. The integrator is configured to perform a differential operation on the first output voltage and the second output voltage outputted by each of the pixel circuits to generate a pair of differential signals corresponding to each of the pixel circuits.

The present disclosure further provides an operating method of an image system. The image system includes a system light source and an image sensor. The image sensor includes an integrator and a plurality of pixel circuits. Each of the pixel circuits includes a photodiode, a first shutter switch, a second shutter switch, a first storage capacitor, a second storage capacitor, a first read switch and a second read switch. The operating method includes the steps of: controlling the first shutter switch with a first shutter signal so as to control a first exposure time of the photodiode to correspond to activating the system light source to allow the first storage capacitor to discharge to a first output voltage; controlling the second shutter switch with a second shutter signal so as to control a second exposure time of the photodiode to correspond to deactivating the system light source to allow the second storage capacitor to discharge to a second output voltage; controlling the first read switch and the second read switch with a read signal to concurrently readout the first output voltage and the second output voltage; and performing, by the integrator, a differential operation on the first output voltage and the second output voltage to generate a pair of differential signals.

The image system of the present disclosure is applicable to a proximity sensor and a gesture recognition system, especially applicable to the operation under strong ambient light.

The image sensor of the present disclosure does not need to acquire another ambient image frame during the system light source being deactivated, and a sampling number of sampling output voltages and a sampling number of the analog to digital converter are reduced.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
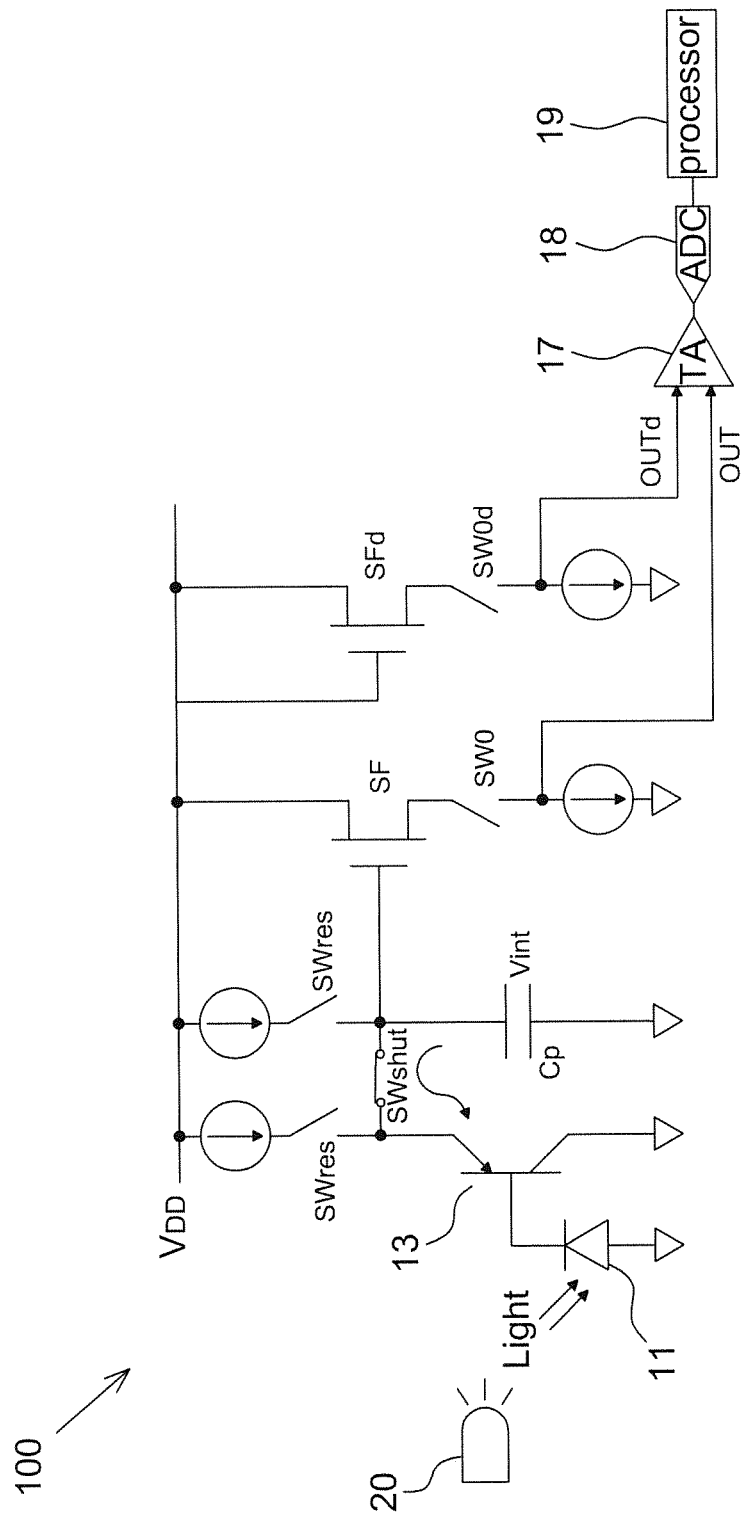
FIG. 1 is a schematic diagram of a conventional BJT pixel circuit.
Figure 2:
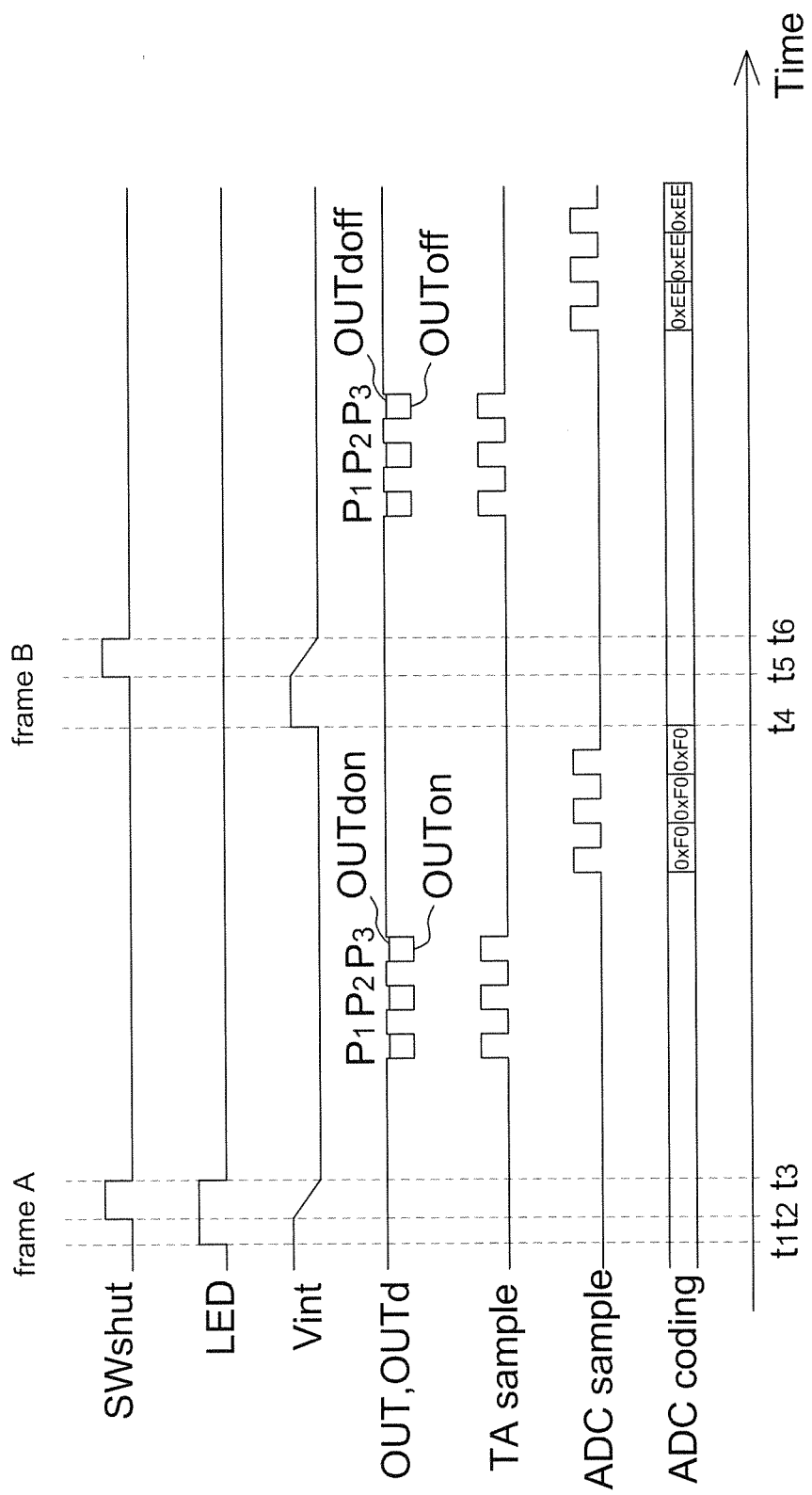
FIG. 2 is an operational timing diagram of an image sensor including the BJT pixel circuit of FIG. 1.
Figure 3:
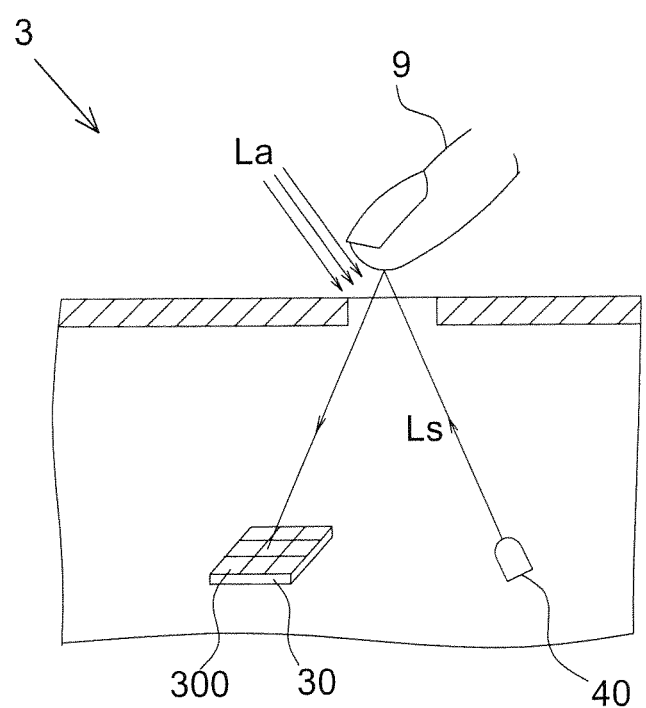
FIG. 3 is an operational schematic diagram of an image system according to one embodiment of the present disclosure.

Referring to FIG. 3, it is an operational schematic diagram of an image system 3 according to one embodiment of the present disclosure. The image system 3 includes an image sensor 30 and a system light source 40. The image system 3 is applicable to a proximity system or a gesture recognition system, and used to detect a proximity operation and/or a gesture of an object 9 (e.g. a finger). The image sensor 30 is preferably an active image sensor such as a CMOS image sensor. During operation, the image sensor 30 detects system light Ls, which is emitted from the system light source 40 and reflected by the object 9, and external ambient light La. When the ambient light La (e.g. sun light) is too strong, the intensity of the system light Ls sensed by the image sensor 30 is very tiny compared to the sensed ambient light La such that the function of the system light source 40 is not apparent and failure can be caused.

Figure 4:
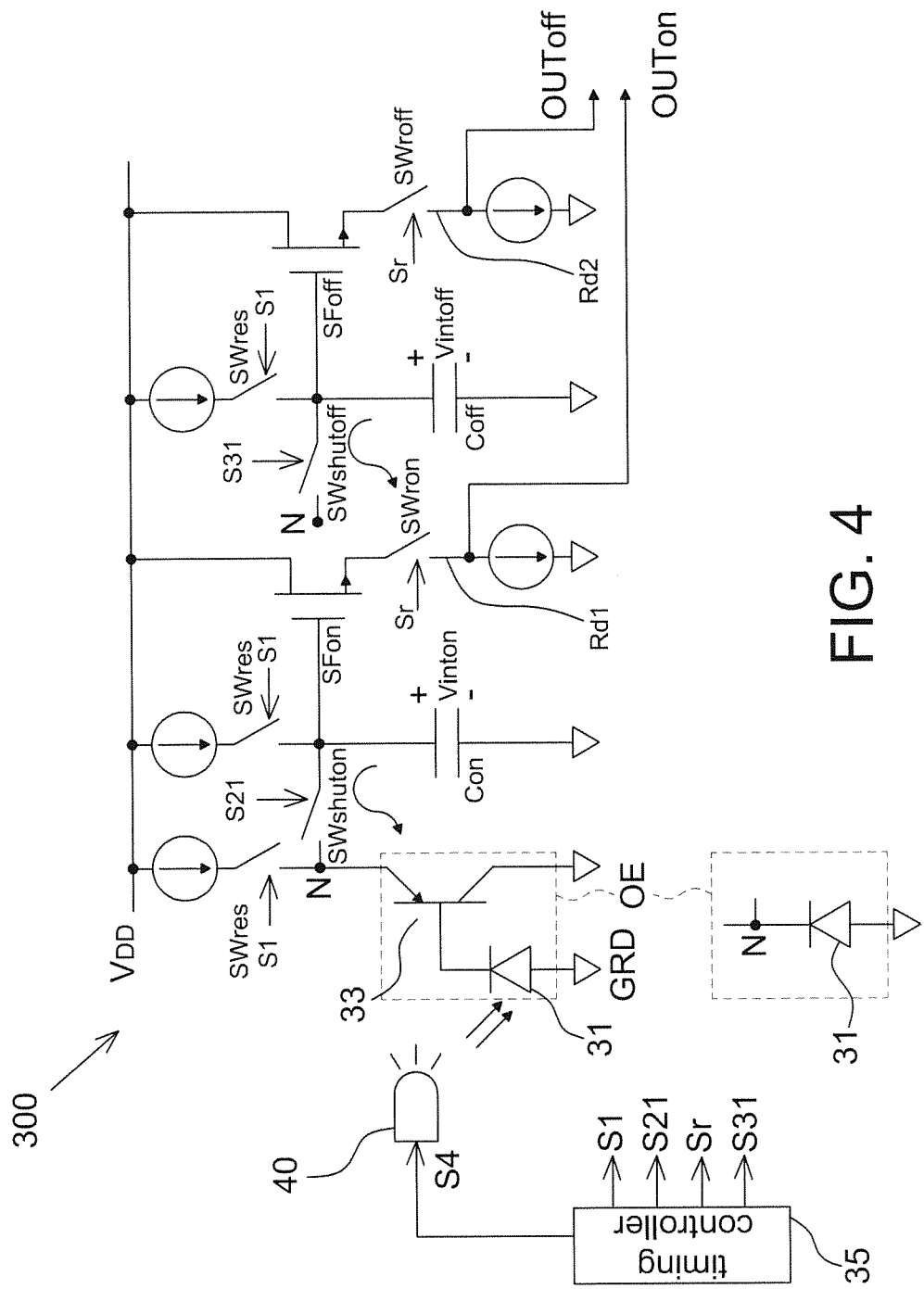
FIG. 4 is a schematic diagram of a BJT pixel circuit according to one embodiment of the present disclosure.
Figure 5:
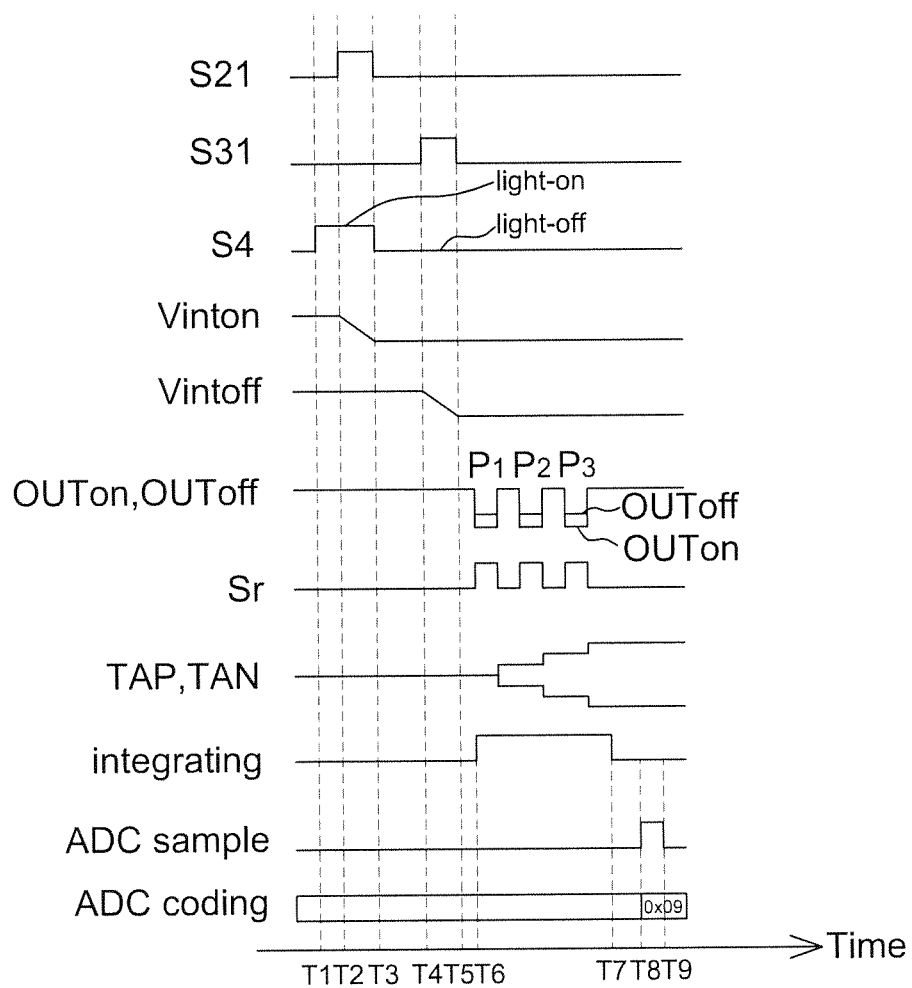
FIG. 5 is an operational timing diagram of an image sensor including the BJT pixel circuit of FIG. 4.

Referring to FIGS. 3 to 5, FIG. 4 is a schematic diagram of a bipolar junction transistor (BJT) pixel circuit 300 according to one embodiment of the present disclosure, and FIG. 5 is an operational timing diagram of an image sensor including the BJT pixel circuit 300 of FIG. 4. The image sensor 30 includes a plurality of BJT pixel circuits 300 arranged in a matrix (e.g. 9 BJT pixel circuits 300 are shown in FIG. 3). The plurality of BJT pixel circuits 300 is configured to generate output voltages OUTon and OUToff corresponding to a light source signal S4, wherein the light source signal S4 has a light-on level and a light-off level (e.g. shown in FIG. 5). The image sensor 30 further includes a timing controller 35 for providing the light source signal S4 to the system light source 40 and providing other control signals S1, S21, SrS S31 (illustrated with examples hereinafter) to the BJT pixel circuits 300. In some embodiments, the timing controller 35 is included, for example, in a processor 39 (e.g. referring to FIGS. 6 and 7), wherein the processor is, for example, a digital signal processor (DSP), a central processing unit (CPU), a microcontroller (MCU) or the like, but not limited thereto.

The BJT pixel circuit 300 includes a photodiode 31, a BJT transistor 33, a first storage capacitor Con, a second storage capacitor Coff, a first shutter switch SWshuton, a second shutter switch SWshutoff, a first read switch SWron, a second read switch SWroff, a first source follower SFon, a second source follower SFoff and three reset switches SWres, wherein the first storage capacitor Con and the first shutter switch SWshuton operate corresponding to the activation (i.e. the light-on level) of the system light source 40, and the second storage capacitor Coff and the second shutter switch SWshutoff operate corresponding to the deactivation (i.e. the light-off level) of the system light source 40.

In one embodiment, the photodiode 31 is integrated in the BJT transistor 33. The BJT transistor 33 is a PNP bipolar junction transistor and the photodiode 31 is integrated in the PN junction between the base and collector of the BJT transistor 33. The emitter of the BJT transistor 33 is coupled to a node N.

In another embodiment, the BJT transistor 33 might not be necessary whereby the photodiode 31 is sufficient. The photodiode 31 has a cathode and an anode. The cathode is coupled to the node N.

That is, in the present disclosure, the emitter of the BJT transistor 33 or the cathode of the photodiode 31 is coupled to the node N.

The photodiode 31 senses both the system light Ls and ambient light La corresponding to the activation of the system light source 40 to generate photocurrent, while the photodiode 31 senses only the ambient light La corresponding to the deactivation of the system light source 40 to generate photocurrent, wherein said photocurrent is positively correlated with the sensed light intensity.

The first storage capacitor Con has a first terminal coupled to the emitter of the BJT transistor 33 (or the cathode of the photodiode 31) via the first shutter switch Swshuton and a second terminal coupled to the ground GRD. A reset switch SWres is coupled between the first terminal of the first storage capacitor Con and a power source $V_{DD}$. The first shutter switch Swshuton is configured to control, according to a first shutter signal S21, a first exposure time (e.g. T2 to T3 shown in FIG. 5) of the photodiode 31 to correspond to the light-on level of the light source signal S4. The first storage capacitor Con is to hold a first predetermined voltage Vinton (e.g. charged by the power source $V_{DD}$ through the reset switch SWres in a reset phase) before the first exposure time and to discharge, via the photodiode 31, to a first output voltage OUTon in the first exposure time, wherein a voltage value of the first output voltage OUTon is determined according to the light exposure of the photodiode 31 within the first exposure time.

The second storage capacitor Coff has a first terminal coupled to the emitter of the BJT transistor 33 (or the cathode of the photodiode 31) via the second shutter switch Swshutoff and a second terminal coupled to the ground GRD. A reset switch SWres is coupled between the first terminal of the second storage capacitor Coff and the power source $V_{DD}$. The second shutter switch Swshutoff is configured to control, according to a second shutter signal S31, a second exposure time (e.g. T4 to T5 shown in FIG. 5) of the photodiode 31 to correspond to the light-off level of the light source signal S4. The second storage capacitor Coff is to hold a second predetermined voltage Vintoff (e.g. charged by the power source $V_{DD}$ through the reset switch SWres in a reset phase) before the second exposure time and to discharge, via the photodiode 31, to a second output voltage OUToff in the second exposure time, wherein a voltage value of the second output voltage OUToff is determined according to the light exposure of the photodiode 31 within the second exposure time.

The first read switch SWron is coupled between the first terminal of the first storage capacitor Con (i.e. the node N) and a readout line Rd1, and to couple the first storage capacitor Con to the readout line Rd1 according to a read signal Sr so as to output the first output voltage OUTon, wherein the read signal Sr is, for example, a row scan signal. The readout line Rd1 is coupled to a column of BJT pixel circuits 300 and a current source, and to transmit the output voltages from each of the coupled BJT pixel circuits 300.

The first source follower SFon has a gate, a source and a drain, and is to buffer the first output voltage OUTon on the first storage capacitor Con nondestructively to the readout line Rd1. The gate of the first source follower SFon is coupled to the first terminal of the first storage capacitor Con (i.e. the node N). The source of the first source follower SFon is coupled to the readout line Rd1 via the first read switch SWron. The drain of the first source follower SFon is coupled to the power source $V_{DD}$.

The second read switch SWroff is coupled between the first terminal of the second storage capacitor Coff (i.e. the node N) and a readout line Rd2, and to couple the second storage capacitor Coff to the readout line Rd2 according to a read signal Sr so as to output the second output voltage OUToff, wherein the read signal Sr is, for example, a row scan signal. The readout line Rd2 is coupled to a column of BJT pixel circuits 300 and a current source, and to transmit the output voltages from each of the coupled BJT pixel circuits 300.

The second source follower SFoff has a gate, a source and a drain, and is to buffer the second output voltage OUToff on the second storage capacitor Coff nondestructively to the readout line Rd2. The gate of the second source follower SFoff is coupled to the first terminal of the second storage capacitor Coff (i.e. the node N). The source of the second source follower SFoff is coupled to the readout line Rd2 via the second read switch SWroff. The drain of the second source follower SFon is coupled to the power source $V_{DD}$.

It should be mentioned that although FIG. 4 shows that the readout line Rd1 coupled to the first read switch SWron and the readout line Rd2 coupled to the second read switch SWroff are two different readout lines, the present disclosure is not limited thereto. In some embodiments, the first read switch SWron and the second read switch SWroff may be coupled to a same readout line to output voltage signals read from the first storage capacitor Con and the second storage capacitor Coff.

Two reset switches SWres are respectively coupled between the power source $V_{DD}$ and the first storage capacitor Con and the second storage capacitor Coff, and to couple the first storage capacitor Con and the second storage transistor Coff to the power source $V_{DD}$ according to a reset signal S1 to respectively charge the first storage capacitor Con and the second storage capacitor Coff to the first predetermined voltage Vinton and the second predetermined voltage Vintoff, wherein values of the first predetermined voltage Vinton and the second predetermined voltage Vintoff are determined according to different applications without particular limitations. Another reset switch SWres is coupled between the power source VDD and the node N (i.e. emitter of the BJT transistor 33 or the cathode of the photodiode 31) and configured to couple the emitter of the BJT transistor 33 or the cathode of the photodiode 31 to the power source $V_{DD}$ according to a reset signal S1 thereby releasing charges left in the photodiode 31 in a reset phase. Accordingly, within the first exposure time, the first storage capacitor Con discharges from the first predetermined voltage Vinton to the first output voltage OUTon through photocurrent; and within the second exposure time, the second storage capacitor Coff discharges from the second predetermined voltage Vintoff to the second output voltage OUToff through photocurrent.

In this embodiment, the first shutter switch SWshuton, the second shutter switch SWshutoff, the first read switch SWron, the second read switch SWroff and the reset switches SWres are, for example, N-type MOS transistors, but not limited thereto, and they may be other analog switches.

In addition, as shown in FIG. 5, before the first exposure time, the system light source 40 further emits light within a pre-flash time (e.g. T1 to T2) so as to allow the BJT transistor 33 to reach a stable output.

Figure 6:
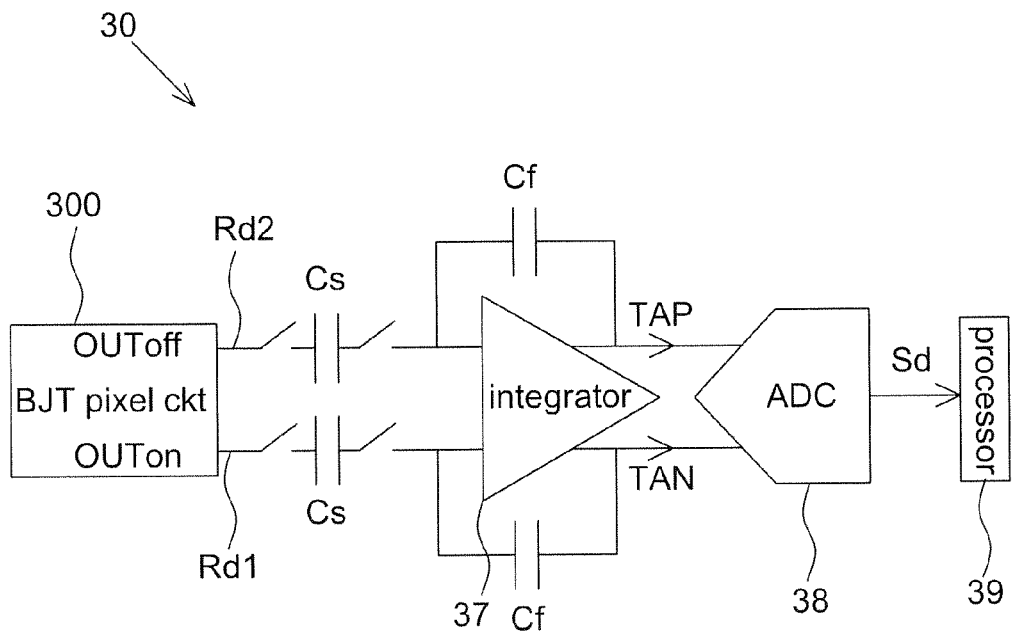
FIG. 6 is a schematic block diagram of an image sensor including the BJT pixel circuit of FIG. 4.

Referring to FIG. 6, it is a schematic block diagram of an image sensor 30 including the BJT pixel circuit 300 in FIG. 4. The image sensor 30 further includes an integrator 37 and an analog to digital converter (ADC) 38, wherein the integrator 37 is, for example, a differential integrator having two input terminals, and the ADC converter 38 is, for example, a differential ADC converter having two input terminals. Two input terminals of the integrator 37 are coupled to the BJT pixel circuits 300 through the readout lines (e.g. Rd1 and Rd2) so as to receive the first output voltage OUTon and the second output voltage OUToff, respectively. The image sensor 30 includes two capacitors Cs for sampling the first output voltage OUTon and the second output voltage OUToff, respectively. The image sensor 30 includes two capacitors Cf coupled between inputs and outputs of the integrator 37 for holding voltage data in the integrating/accumulating process performed by the integrator 37.

Referring to FIGS. 4-6, when the first read switch SWron and the second read switch SWroff are switched on, the integrator 37 reads first output voltages OUTon and second output voltages OUToff from, for example, three pixel circuits P1 to P3, wherein for illustration purpose the pixel circuits P1 to P3 are assumed to generate identical output voltages herein. As mentioned above, as the first output voltage OUTon reflects the system light Ls and the ambient light La together (referring to FIG. 3), while the second output voltage OUToff reflects only the ambient light La, a voltage value of the first output voltage OUTon is considered to be lower than that of the second output voltage OUToff. The integrator 37 is to perform the differential operation on the first output voltage OUTon and the second output voltage OUToff outputted from each of the BJT pixel circuits 300 so as to generate differential signals TAP and TAN, e.g., TAP−TAN=(OUToff−OUTon). In some embodiments, the integrator 37 further amplifies the differential signals TAP and TAN with a gain, e.g., TAP−TAN=G×(OUToff−OUTon). The ADC converter 38 is to convert the differential signals (OUToff−OUTon) or amplified differential signals G×(OUToff−OUTon) to a digital signal Sd, wherein the digital signal Sd includes the effect of system light Ls but does not include the effect of ambient light La.

In some embodiments, under strong ambient La, where the system light Ls is very small compared to the ambient light La, the integrator 37 integrates/accumulates more differential signals TAP and TAN to generate integrated/accumulated differential signals. For example in FIG. 5, the integrator 37 respectively amplifies and integrates/accumulates the differential signals TAP and TAN corresponding to the pixel circuits P1 to P3 in a time interval T6 to T7. More specifically, the integrator 37 amplifies and integrates/accumulates the differential signals TAP and TAN corresponding to all BJT pixel circuits 300 of a sensor array of the image sensor 30 so as to output integrated/accumulated and amplified differential signals corresponding to every frame, e.g., TAP−TAN=NP×G×(OUToff−OUTon), wherein the term "NP" indicates a number of BJT pixel circuits 300 being integrated/accumulated and the term "G" indicates a gain, and it is also assumed that every BJT pixel circuit 300 has substantially identical outputs. As mentioned above, under strong ambient light La, the system light Ls is very small compared to the ambient light La, by employing the integrator 37, the signal to noise ratio (SNR) is significantly improved and the accuracy of the proximity detection is improved. In some embodiments, when the image sensor 30 is not under strong ambient light La, the integrator 37 amplifies and accumulates the differential signals TAP and TAN corresponding to lesser number of BJT pixel circuits 300. More specifically, in the present disclosure, an accumulated number of the differential signals of the BJT pixel circuits 300 is adjustable (i.e. NP is adjustable). Finally, the ADC converter 38 samples the amplified and accumulated differential signals NP×G×(TAP−TAN) to generate a digital signal Sd, e.g. shown as coding 0x09 in FIG. 5, but not limited thereto. Therefore, as the ADC converter 38 samples the accumulated differential signals instead of samples the signal output by each of the BJT pixel circuits 300, the sampling of the ADC converter 38 is reduced.

Figure 7:
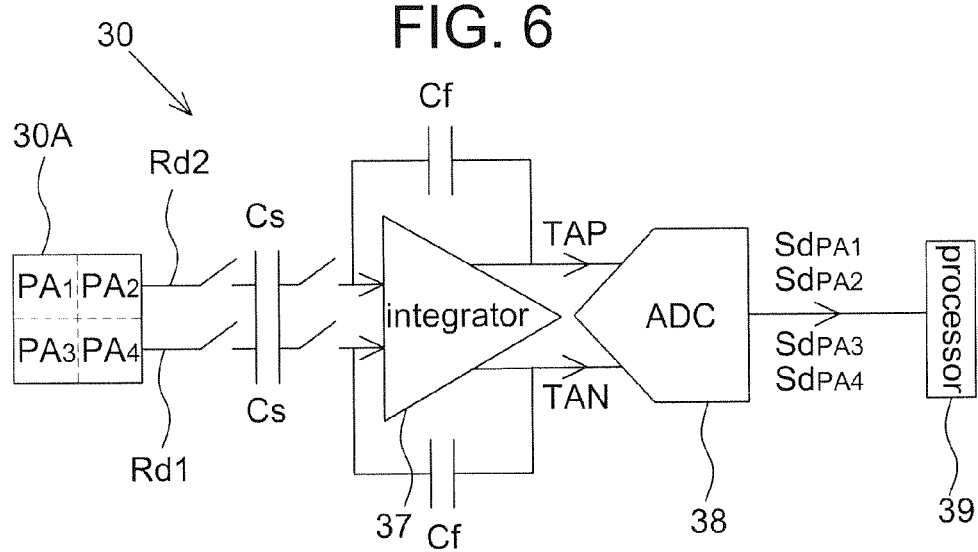
FIG. 7 is another schematic block diagram of an image sensor including the BJT pixel circuit of FIG. 4.

In some embodiments, the integrator 37 accumulates the differential signals TAP and TAN corresponding to a part of BJT pixel circuits 300 of a sensor array of the image sensor 30 instead of corresponding to all BJT pixel circuits 300. Referring to FIG. 7, the image sensor 30 includes a sensor array 30A which is divided into a first pixel area PA1, a second pixel area PA2, a third pixel area PA3 and a fourth pixel area PA4, wherein each of the pixel areas PA1 to PA4 includes a plurality of BJT pixel circuits 300 shown in FIG. 4. The integrator 37 amplifies and accumulates the differential signals TAP and TAN corresponding to the BJT pixel circuits 300 in the first pixel area PA1 to generate amplified and accumulated differential signals NP×G×(TAP−TAN), and the ADC converter 38 digitizes the amplified and accumulated differential signals NP×G×(TAP−TAN) to generate a digital signal $Sd_{PA1}$. Similarly, the ADC converter 38 generates digital signals $Sd_{PA2}$, $Sd_{PA3}$ and $Sd_{PA4}$ corresponding to the second pixel area PA1 the third pixel area PA3 and the fourth pixel area PA4, respectively. A processor 39 respectively identifies a proximity operation of an object corresponding to every pixel area PA1 to PA4 according to the digital signals $Sd_{PA1}$ to $Sd_{PA4}$ so as to implement the function of gesture recognition, e.g. identifying a moving direction of the gesture/object, based on the variation of the digital signals $Sd_{PA1}$ to $Sd_{PA4}$ of every pixel area PA1 to PA4. It should be mentioned that although FIG. 7 shows that the pixel areas PA1 to PA4 are coupled to a same integrator 37 and ADC converter 38, it is only intended to illustrate but not to limit the present disclosure. In other embodiments, the pixel areas PA1 to PA4 are respectively coupled to an individual integrator 37 and ADC converter 38, e.g. numbers of the integrators 37 and ADC converters 38 are equal to a number of the pixel areas.

Figure 8:
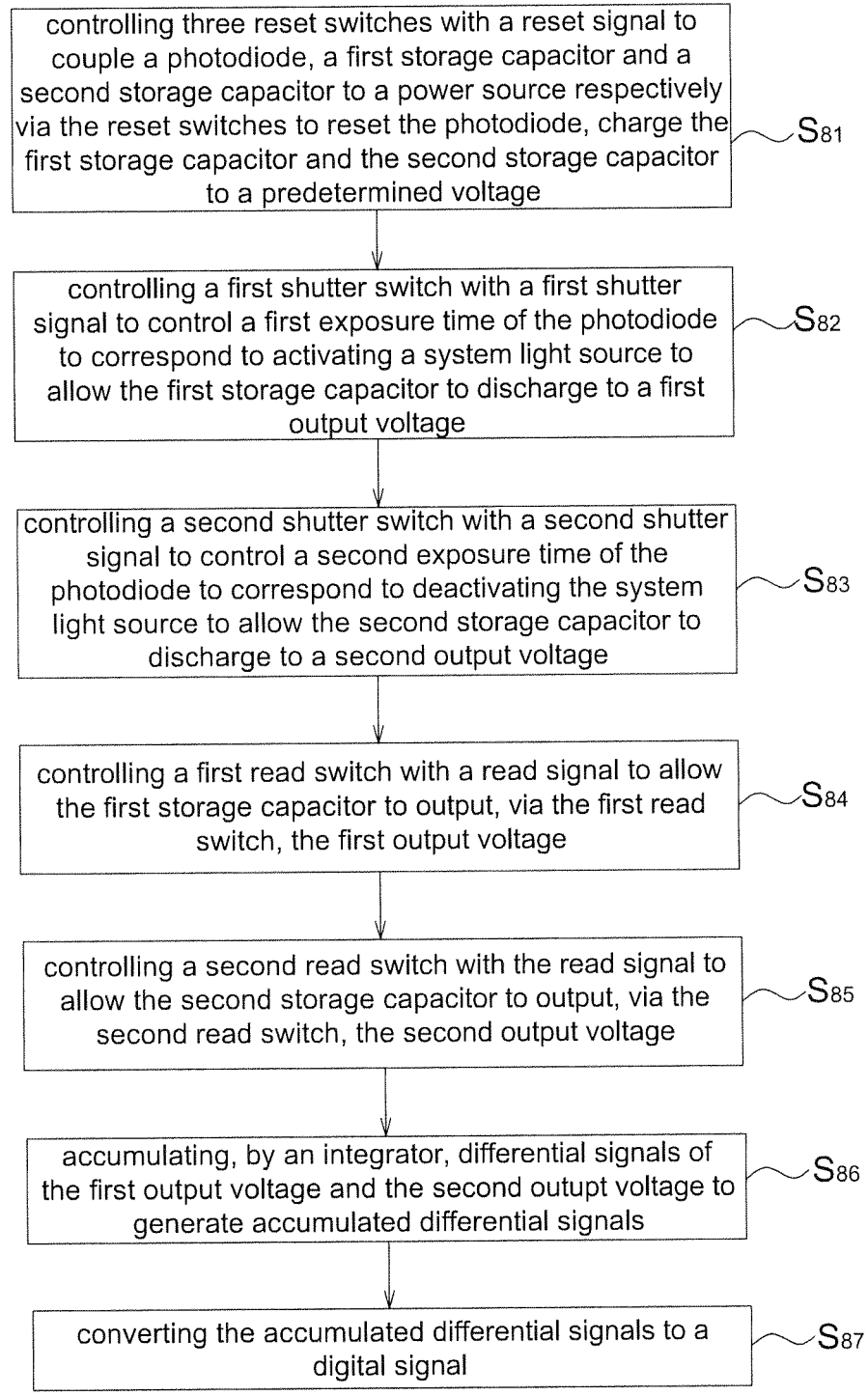
FIG. 8 is a flow chart of an operating method of an image system according to one embodiment of the present disclosure.

Referring to FIG. 8, it is a flow chart of an operating method of an image system 3 according to one embodiment of the present disclosure, which includes the steps of: controlling three reset switches with a reset signal to couple a photodiode, a first storage capacitor and a second storage capacitor to a power source respectively via the reset switches to reset the photodiode and charge the first storage capacitor and the second storage capacitor to a predetermined voltage (Step S81); controlling a first shutter switch with a first shutter signal so as to control a first exposure time of the photodiode to correspond to activating a system light source to allow the first storage capacitor to discharge to a first output voltage (Step S82); controlling a second shutter switch with a second shutter signal so as to control a second exposure time of the photodiode to correspond to deactivating the system light source to allow the second storage capacitor to discharge to a second output voltage (Step S83); controlling a first read switch with a read signal to allow the first storage capacitor to output, via the first read switch, the first output voltage (Step S84); controlling a second read switch with the read signal to allow the second storage capacitor to output, via the second read switch, the second output voltage (Step S85); accumulating, by an integrator, differential signals of the first output voltage and the second output voltage to generate accumulated differential signals (Step S86); and converting the accumulated differential signals to a digital signal (Step S87), wherein when the image system 3 operates under stronger ambient light, a number of the accumulated differential signals is higher; whereas when the image system 3 operates under weaker ambient light, a number of the accumulated differential signals is lower thereby improving the SNR.

Referring to FIGS. 4 to 6 and 8, details of the operating method are illustrated hereinafter.

Step S81: Firstly, a timing controller 35 (or a processor 39) sends a reset signal S1 in a reset phase to conduct three reset switches SWres. Accordingly, a first storage capacitor Con, a second storage capacitor Coff and a photodiode 31 (or an emitter of BJT transistor 33 if it is included) are respectively coupled to a power source $V_{DD}$ via the reset switches SWres. The power source $V_{DD}$ provides a current to respectively charge the first storage capacitor Con and the second storage capacitor Coff to a first predetermined voltage Vinton and a second predetermined voltage Vintoff, and reset the photodiode 31.

Step S82: The timing controller 35 sends a first shutter signal S21 for controlling a first shutter switch SWshuton so as to control a first exposure time (e.g. T2 to T3) of the photodiode 31 to correspond to activating a system light source 40 (e.g. activated by a light source signal S4) to allow the first storage capacitor Con to discharge, e.g., via the BJT transistor 33 or photodiode 31, to a first output voltage OUTon, wherein the first output voltage OUTon is determined according to the light absorption of the photodiode 31.

Step S83: The timing controller 35 sends a second shutter signal S31 to control a second shutter switch SWshutoff so as to control a second exposure time (e.g. T4 to T5) of the photodiode 31 to correspond to deactivating the system light source 40 to allow the second storage capacitor Coff to discharge, e.g., via the BJT transistor 33 or photodiode 31, to a second output voltage OUToff, wherein the second output voltage OUToff is determined according to the light absorption of the photodiode 31.

Step S84: The timing controller 35 then sends a read signal Sr to control a first read switch SWron to conduct to allow the first storage capacitor Con to output, via the first read switch SWron, the first output voltage OUTon to a readout line Rd1. As mentioned above, in order to buffer the first output voltage OUTon on the first storage capacitor Con nondestructively to the readout line Rd1, a first source follower SFon is coupled between the first read switch SWron and the first storage capacitor Con.

Step S85: Meanwhile, the timing controller 35 sends the read signal Sr to control a second read switch SWroff to conduct to allow the second storage capacitor Coff to output, via the second read switch SWroff, the second output voltage OUToff to a readout line Rd2. Similarly, in order to buffer the second output voltage OUToff on the second storage capacitor Coff nondestructively to the readout line Rd2, a second source follower SFoff is coupled between the second read switch SWroff and the second storage capacitor Coff.

It should be mentioned that although FIG. 5 shows that the read signal Sr conducts the first read switch SWron and the second read switch Swoff concurrently (e.g. the Steps S84 and S85 in FIG. 8 combined in one step) to concurrently readout the first output voltage OUTon and the second output voltage OUToff, but the present disclosure is not limited thereto. In some embodiments, the read signal Sr may non-concurrently conduct the first read switch SWron and the second read switch SWroff as long as an integrator 37 coupled behind the readout lines is able to perform the differential, amplification and integration/accumulation operations on the first output voltage OUTon and the second output voltage OUToff, e.g., including a delay circuit or storage components.

Step S86: Next, the integrator 37 receives the first output voltage OUTon and the second output voltage OUToff through the readout lines (e.g. Rd1 and Rd2) and performs differential operation on the first output voltage OUTon and the second output voltage OUToff to generate a pair of differential signals TAP and TAN. The integrator 37 also performs the amplification and integration/accumulation operations on the differential signals TAP and TAN of the first output voltage OUTon and the second output voltage OUToff to generate amplified and accumulated differential signals TAP and TAN, e.g., NP×G×(TAP−TAN), wherein NP is adjustable in the present disclosure.

Step S87: Finally, a ADC converter 38 converts the amplified and accumulated differential signals to a digital signal Sd, wherein the digital signal Sd is sent to a processor 39 for post-processing, e.g. performing the proximity detection or gesture recognition.

It should be mentioned that FIG. 5 is only intended to show the sequential relationship but the signal interval and the interval between signals are not limited to those shown in FIG. 5.

It should be mentioned that although a differential ADC converter is taken as an example in the above embodiments, the present disclosure is not limited thereto. The differential ADC converter has a merit to reduce the noise so as to obtain better detection results. In other embodiments, an ADC converter with a single input may be used, and the integrator sends one of the pair of differential signals or integrated differential signals to the single input (e.g. TAP or TAN).

As mentioned above, the conventional BJT pixel circuit is not able to effectively cancel the influence of ambient light. Especially when being applied to a proximity sensor, the conventional BJT pixel circuit is not able to function normally under strong ambient light. Therefore, the present disclosure further provides a BJT pixel circuit (FIG. 4), an image system including the same and an operating method thereof (FIG. 8) in which the influence of ambient light is cancelled in an analog front end. In the present disclosure, the difference between a first output voltage when a system light source is turned on and a second output voltage when the system light source is turned off is increased by employing an integrator, which is configured to accumulate differential signals of at least a part of pixel circuits, to be applicable to a proximity sensor and a gesture recognition system operated under strong ambient light.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A bipolar junction transistor (BJT) pixel circuit, configured to generate voltage signals corresponding to a light source signal, the light source signal including a light-on level and a light-off level, the pixel circuit comprising:
 a photodiode;
 a first read switch and a second read switch;
 a first shutter switch configured to control a first exposure time of the photodiode to correspond to the light-on level according to a first shutter signal;
 a second shutter switch configured to control a second exposure time of the photodiode to correspond to the light-off level according to a second shutter signal;

a first storage capacitor having a first terminal coupled to the photodiode via the first shutter switch and a second terminal coupled to a ground, the first storage capacitor configured to hold a first predetermined voltage before the first exposure time and discharge, via the photodiode, to a first output voltage in the first exposure time;

a first source follower having a gate coupled to the first terminal of the first storage capacitor, a source coupled to a readout line via the first read switch, and a drain coupled to a power source;

a second storage capacitor having a first terminal coupled to the photodiode via the second shutter switch and a second terminal coupled to the ground, the second storage capacitor configured to hold a second predetermined voltage before the second exposure time and discharge, via the photodiode, to a second output voltage in the second exposure time; and a second source follower having a gate coupled to the first terminal of the second storage capacitor, a source coupled to the readout line via the second read switch, and a drain coupled to the power source.

2. The pixel circuit as claimed in claim 1, further comprising two reset switches configured to couple the first storage capacitor and the second storage capacitor to the power source according to a reset signal to charge the first storage capacitor and the second storage capacitor to the first predetermined voltage and the second predetermined voltage, respectively.

3. The pixel circuit as claimed in claim 1, further comprising a reset switch configured to couple the photodiode to the power source according to a reset signal to release charges.

4. The pixel circuit as claimed in claim 1, wherein the first read switch is configured to couple the first storage capacitor to the readout line according to a read signal so as to output the first output voltage.

5. The pixel circuit as claimed in claim 1, wherein the second read switch is configured to couple the second storage capacitor to the readout line according to a read signal so as to output the second output voltage.

6. The pixel circuit as claimed in claim 1, wherein the photodiode is integrated in a BJT transistor.

7. An image system, comprising:
a system light source; and
an image sensor comprising:
a plurality of pixel circuits, each of the pixel circuits comprising:
a photodiode;
a first read switch and a second read switch;
a first shutter switch configured to control, according to a first shutter signal, a first exposure time of the photodiode to correspond to activating the system light source;
a second shutter switch configured to control, according to a second shutter signal, a second exposure time of the photodiode to correspond to deactivating the system light source;
a first storage capacitor having a first terminal coupled to the photodiode via the first shutter switch and a second terminal coupled to a ground, the first storage capacitor configured to hold a first predetermined voltage before the first exposure time and discharge, via the photodiode, to a first output voltage in the first exposure time;
a first source follower having a gate coupled to the first terminal of the first storage capacitor, a source coupled to a first readout line via the first read switch, and a drain coupled to a power source;
a second storage capacitor having a first terminal coupled to the photodiode via the second shutter switch and a second terminal coupled to the ground, the second storage capacitor configured to hold a second predetermined voltage before the second exposure time and discharge, via the photodiode, to a second output voltage in the second exposure time; and
a second source follower having a gate coupled to the first terminal of the second storage capacitor, a source coupled to a second readout line via the second read switch, and a drain coupled to the power source; and an integrator configured to perform a differential operation on the first output voltage and the second output voltage outputted by each of the pixel circuits to generate a pair of differential signals corresponding to each of the pixel circuits.

8. The image system as claimed in claim 7, wherein the integrator is further configured to accumulate the differential signals corresponding to a plurality of pixel circuits to generate accumulated differential signals.

9. The image system as claimed in claim 8, wherein the image sensor further comprises an analog to digital converter configured to covert the accumulated differential signals to a digital signal.

10. The image system as claimed in claim 7, wherein each of the pixel circuits further comprises two reset switches configured to couple the first storage capacitor and the second storage capacitor to the power source according to a reset signal to charge the first storage capacitor and the second storage capacitor to the first predetermined voltage and the second predetermined voltage, respectively.

11. The image system as claimed in claim 7, wherein the first read switch is configured to couple the first storage capacitor to the first readout line according to a read signal so as to output the first output voltage.

12. The image system as claimed in claim 7, wherein the second read switch is configured to couple the second storage capacitor to the second readout line according to a read signal so as to output the second output voltage.

13. An operating method of an image system, the image system comprising a system light source and an image sensor, the image sensor comprising an integrator and a plurality of pixel circuits, each of the pixel circuits comprising a photodiode, a first shutter switch, a second shutter switch, a first storage capacitor, a second storage capacitor, a first source follower, a second source follower, a first read switch and a second read switch, the operating method comprising:

controlling the first shutter switch with a first shutter signal so as to control a first exposure time of the photodiode to correspond to activating the system light source to allow the first storage capacitor to discharge to a first output voltage;

controlling the second shutter switch with a second shutter signal so as to control a second exposure time of the photodiode to correspond to deactivating the system light source to allow the second storage capacitor to discharge to a second output voltage;

controlling the first read switch and the second read switch with a read signal to concurrently readout the first output voltage via the first source follower and the first read switch to a first readout line and readout the second output voltage via the second source follower and the second read switch to a second readout line; and performing, by the integrator, a differential operation on the first output voltage and the second output voltage to generate a pair of differential signals.

14. The operating method as claimed in claim 13, further comprising:

accumulating, by the integrator, the differential signals to generate accumulated differential signals.

15. The operating method as claimed in claim 14, further comprising:

converting the accumulated differential signals to a digital signal.

16. The operating method as claimed in claim 13, wherein each of the pixel circuits further comprises two reset switches, and the operating method further comprises:

controlling the two reset switches with a reset signal to couple the first storage capacitor and the second storage capacitor to a power source via the two reset switches to charge the first storage capacitor and the second storage capacitor to a predetermined voltage, respectively.

* * * * *